Dec. 23, 1952          H. J. BERTRAM          2,622,360
DECOY
Filed July 29, 1948
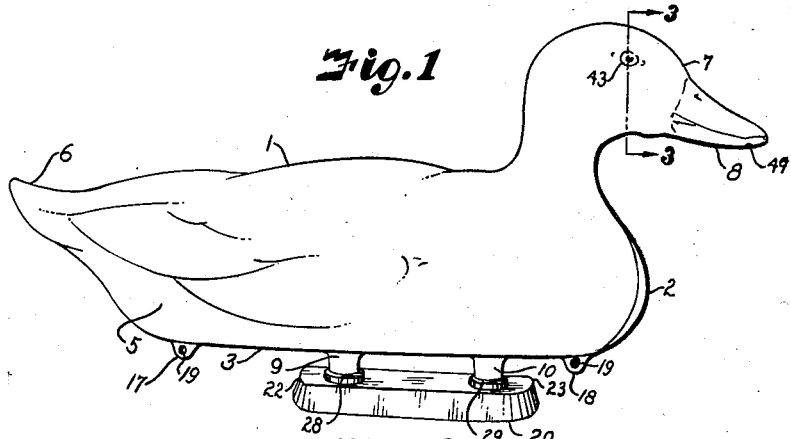
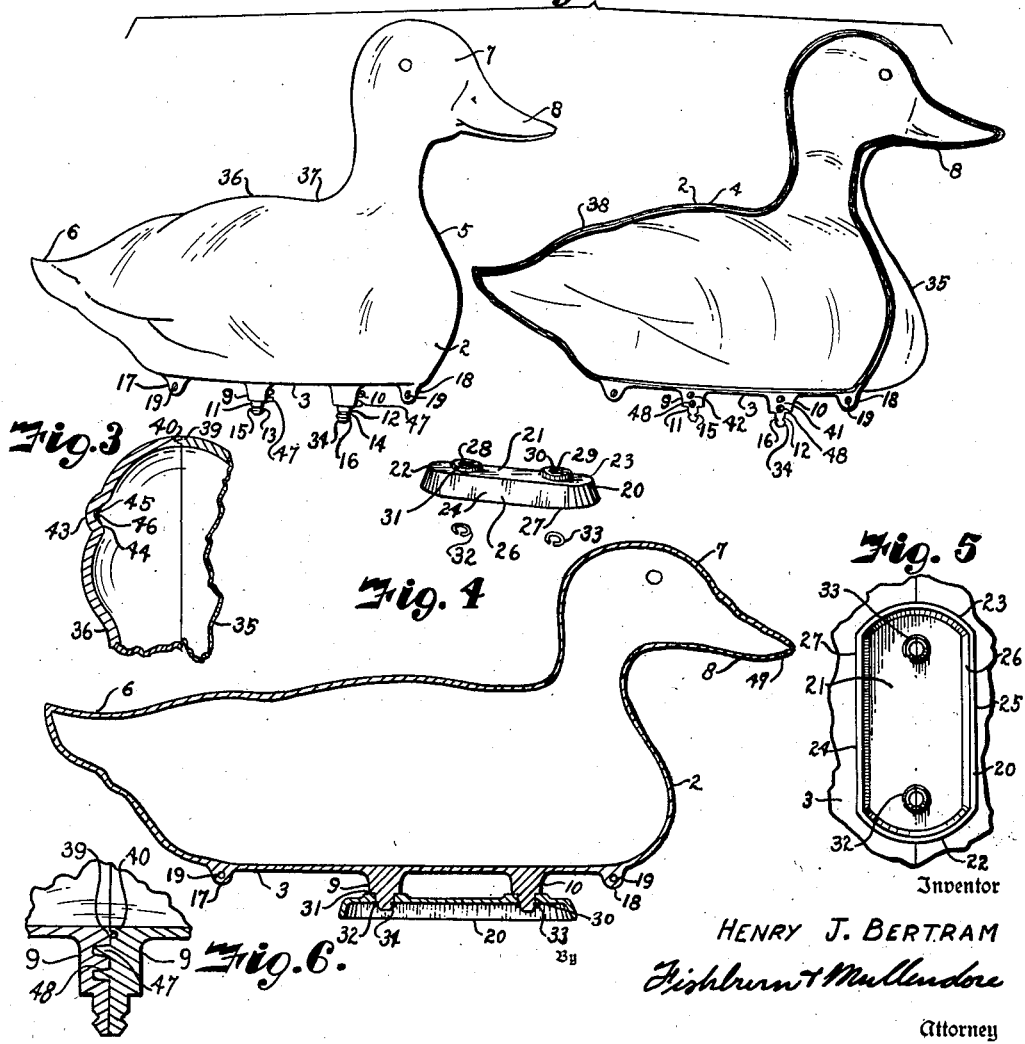
Inventor
HENRY J. BERTRAM
Attorney Patented Dec. 23, 1952

2,622,360

UNITED STATES PATENT OFFICE 2,622,360

DECOY

Henry J. Bertram, Kansas City, Mo.

Application July 29, 1948, Serial No. 41,241

2 Claims. (Cl. 43—3)

This invention relates to decoys, particularly in simulation of ducks, geese or the like and used by hunters for attracting wild fowl into shooting range.

The principal object of the invention is to provide a light-weight decoy structure which is adapted to be readily manufactured and assembled from plastic in substantially close likeness to a corresponding live decoy.

Other objects of the invention are to provide a simple and secure attachment for a weight to support the decoy in upright realistic floating position; to provide a decoy with eyes of life-like appearance; to provide a decoy in which the body is formed of right and left sections; to provide a hollow plastic decoy that is not distorted by change in temperature; to provide a weight having a shape to give the desired weight distribution and center of gravity; and to provide weight and anchor attachments that are formed as integral parts of the body shell of the decoy.

In accomplishing these and other objects of the invention, I have provided improved structure, the preferred form of which is illustrated in the accompanying drawing wherein:

Fig. 1 is a perspective view of a decoy constructed in accordance with the present invention.

Fig. 2 is a perspective view of the parts of the decoy prior to assembly and shown in related spaced position.

Fig. 3 is a section through the head portion of the decoy on the line 3—3 of Fig. 1.

Fig. 4 is a longitudinal section through the decoy.

Fig. 5 is an underneath plane view of the weight, the body shell of the decoy being shown fragmentarily.

Fig. 6 is an enlarged section through the weight attaching lugs illustrating the guide pins for aligning the lugs and bottoms of the body sections.

Referring more in detail to the drawings:

1 designates a decoy constructed in accordance with the present invention and which includes a light-weight hollow body shell 2. The body shell illustrated is a simulation of a wild duck although it may be provided in other forms without departing from the spirit of the invention.

The body 2 has a substantially flat bottom 3, sides 4 and 5, a tail portion 6, a head 7 and bill 8. Depending from the longitudinal center of the flat bottom are lugs 9 and 10 having annular shoulders 11 and 12 encircling pin-like terminals 13 and 14 which are provided in spaced relation with the shoulders 11 and 12 with annular grooves 15 and 16. Also depending from the flat bottom and in alignment with the lugs 9 and 10 are ears 17 and 18 having apertures 19 for attaching a cord (not shown) by which a series of the decoys may be connected together or secured to an anchor.

Secured to the lugs 9 and 10 on the body shell of the decoy is a weight 20 having an elongated, substantially flat plate portion 21 having rounded ends 22 and 23 joining with substantially flat parallel sides 24 and 25. Depending from the plate portion 21 of the weight is a slightly outwardly flaring skirt 26 having a flat bottom edge 27 so that the decoy may be stably supported on a flat surface. The plate portion of the weight also has bosses 28 and 29 at the ends thereof and which are provided with axial openings 30 and 31 spaced in accordance with the axial spacing of the pin terminals 13 and 14 of the lugs 9 and 10, the bosses having flat tops so as to seat against the shoulders 11 and 12 when the pin terminals of the lugs are passed through the respective openings 28 and 29. The annular grooves 15 and 16 are so located on the terminals so that they are positioned just under the plate portion of the weight as shown in Fig. 4 to accommodate split rings 32 and 33 that are expanded over the terminal ends of the pins to snap into the grooves 15 and 16 when the rings are pressed over the ends of the pins. To facilitate application of the rings, the ends of the pins are preferably bevelled as indicated at 34.

The body shell of the duck is preferably formed of a light-weight plastic which is adapted to be molded into a shell of desired thickness. To facilitate construction, the body shell is formed in right and left sections 35 and 36 having mating edges 37 and 38, one of which has a slight rib 39 which is adapted to engage within a groove 40 of the other.

To provide symmetry and a balanced construction one-half of each lug 9 and 10 and one-half of each ear 17 and 18 are formed on the respective sections with adjoining faces 41 and 42 thereof located in the planes of the edges so that when the sections are placed in juxtaposition the faces of the lugs and ears will be in contact. The plastic used is preferably transparent or substantially translucent so that the eyes 43 may be formed by embossments 44 as shown in Fig. 3, with the insides provided with concentric concavities 45 and 46. The inner concavities are spotted with a coloring material such as paint and the larger concavity 45 is encircled about the smaller with coloring material, the coloring material being visible through the transparency of the plastic material to give the eyes a lifelike appearance.

To facilitate joining of the lugs of the respective sections and registry of the bottom edges, the lugs on one section have pins 47 that engage recesses 48 in the lugs of the other section.

In assembling the body shell of the decoy, the eyes are first painted as just described and a suitable plastic cement or solvent is applied to the edges 37 and 38 as well as the flat faces 41 and 42 of the lugs 9—10 and ears 17—18. The sections 35 and 36 are then fitted together with the pins 47 entering the recesses 48 and the rib 39 entering the groove 40. The sections may then be placed in a suitable clamp or they may be taped together to support them in assembled relation until the edges are joined to provide a substantially solid construction as well as a leak-tight joint. The exterior of the decoy may then be painted in any suitable manner to indicate the markings as found on the simulated bird. The weight 20 is then attached by bringing the plate portion 21 into position so that the terminal pins 13 and 14 pass through the apertures 30 and 31 and the upper face of the plate portion is seated against the shoulders 11 and 12. The split rings 32 and 33 are then pushed over the bevelled ends of the pins 13 and 14 so that they expand and snap into the grooves 15 and 16 to retain the weight as shown in Fig. 4. The flange or skirt portion 26 of the weight provides a guard for protecting the attachment points of the weight and provides a flat seating surface which stably supports the decoy.

In using the decoy it may be anchored in floating position by attaching a line (not shown) to one of the ears 17 or 18 or a series of the decoys may be connected together by lines passed through the apertures in the ears which may be tied thereto to maintain the desired spacing of the decoys.

In order to prevent the decoys from being effected by changes in temperature, the underside of the bill is preferably provided with a small vent opening 49 to permit breathing as the interior air expands and contracts on changes of temperature.

A decoy constructed and assembled as described is light in weight and when placed in the water has very close simulation to movement and appearance to the natural duck which it simulates. The structure disclosed facilitates formation of the decoy from light weight, substantially strong plastic material and permits the formation of a hollow body which is readily shaped to the desired contour and which is extremely rugged and serviceable in use even though the portion of the body above the water line may become perforated with shot. The shape of the decoy is also such that it has a substantially shallow draft and therefore is not likely to be perforated with shot below the water line. The nature of the plastic and method of coloring the eyes gives a life-like appearance.

From the foregoing it is obvious that I have provided a decoy that is capable of being inexpensively formed of plastic material and the parts assembled to provide a strong, light-weight, serviceable decoy.

What I claim and desire to secure by Letters Patent is:

1. A decoy including an elongated body formed of plastic material and having a relatively thin flat bottom, lugs integral with said bottom and projecting downwardly therefrom in spaced apart relation in the longitudinal direction of said body, said lugs having integral pin-like extensions and of smaller diameter to cooperate with said lugs in forming stop shoulders, a weight having a plate portion provided with apertures spaced apart in accordance with the spacing of the pin-like extensions for passing said pin-like extensions therethrough to seat said plate portion of the weight against said stop shoulders and retain said weight in fixed relation with respect to the longitudinal direction of said body, said pin-like extensions having annular grooves on the side of the plate portion opposite said shoulders, and retaining rings seating in said groove and engaging the plate portion to retain the weight against said stop shoulders, said plate portion of the weight having a depending marginal flange projecting below said pin-like extensions in protecting relation with the retaining rings and for forming a stable support for the decoy.

2. A decoy including substantially elongated complementary concavo convex sections, each in simulation of one side of a water fowl and formed of plastic material, said sections having mating edges connected together to form a water tight joint, lugs spaced apart in the longitudinal direction of said sections and consisting of complementary portions integral with the respective sections and projecting downwardly from the under side of the sections at said joint and having contacting faces, said complementary portions having pin-like extensions cooperating with the integral portions in forming stop shoulders and provided with grooves exteding transversely on the outer sides of said complementary extensions, a weight provided with apertures spaced apart in accordance with the spacing of the pin-like extensions for passing the pin-like extensions to seat the weight against said shoulders, and rings in said grooves and engaging the side of the weight opposite the shoulders to retain the weight, said weight including a depending marginal flange terminating below the level of said pin-like portions to provide a stable support for the decoy.

HENRY J. BERTRAM.

REFERENCES CITED

The following references are of record in the file of this patent:

UNITED STATES PATENTS

| Number | Name | Date |
|---|---|---|
| 156,239 | Strater | Oct. 27, 1874 |
| 477,084 | Thorn | June 14, 1892 |
| 970,003 | Wethall | Sept. 13, 1910 |
| 1,061,395 | Miller | May 13, 1913 |
| 1,392,065 | Klock | Sept. 27, 1921 |
| 1,444,342 | Godward | Feb. 6, 1923 |
| 1,457,388 | Newman | June 5, 1923 |
| 1,608,375 | Dewey | Nov. 23, 1926 |
| 1,641,215 | Winter | Sept. 6, 1927 |
| 1,801,961 | Hukill et al. | Apr. 21, 1931 |
| 2,162,786 | Oeding | June 20, 1939 |
| 2,302,206 | Gibson | Nov. 17, 1942 |
| 2,370,017 | Delvaux | Feb. 20, 1945 |
| 2,391,475 | Newhardt | Dec. 25, 1945 |